United States Patent
Hsiao et al.

(10) Patent No.: US 10,946,254 B1
(45) Date of Patent: Mar. 16, 2021

(54) GOLF CLUB HEAD AND METHOD FOR MANUFACTURING THE SAME

(71) Applicant: ADVANCED INTERNATIONAL MULTITECH CO., LTD., Kaohsiung (TW)

(72) Inventors: Chi-Nan Hsiao, Kaohsiung (TW); Chih-An Hsu, Kaohsiung (TW)

(73) Assignee: ADVANCED INTERNATIONAL MULTITECH CO., LTD., Kaohsiung (TW)

( * ) Notice: Subject to any disclaimer, the term of this patent is extended or adjusted under 35 U.S.C. 154(b) by 0 days.

(21) Appl. No.: 16/878,711

(22) Filed: May 20, 2020

(30) Foreign Application Priority Data

Dec. 25, 2019 (TW) ................................. 108147591

(51) Int. Cl.
| | |
|---|---|
| B29C 33/56 | (2006.01) |
| A63B 53/04 | (2015.01) |
| B29C 70/46 | (2006.01) |
| B29C 33/68 | (2006.01) |
| B29L 31/52 | (2006.01) |
| B29K 307/04 | (2006.01) |

(52) U.S. Cl.
CPC .......... *A63B 53/0466* (2013.01); *B29C 33/68* (2013.01); *B29C 70/46* (2013.01); *A63B 2209/02* (2013.01); *B29K 2307/04* (2013.01); *B29L 2031/5227* (2013.01)

(58) Field of Classification Search
CPC ............................ A63B 53/0466; B29C 33/68
USPC .................................................. 473/324–350
See application file for complete search history.

(56) References Cited

U.S. PATENT DOCUMENTS

| | | | | |
|---|---|---|---|---|
| 5,692,972 A | * | 12/1997 | Langslet ................ | A63B 60/00 473/332 |
| 5,985,197 A | * | 11/1999 | Nelson ................... | A63B 53/04 264/221 |
| 6,248,024 B1 | * | 6/2001 | Nelson ................... | A63B 53/04 473/324 |
| 6,340,509 B1 | * | 1/2002 | Nelson ................... | B29C 33/40 428/34.7 |
| 6,977,188 B2 | * | 12/2005 | Takase ................... | B29C 33/68 438/106 |
| 7,189,165 B2 | * | 3/2007 | Yamamoto ............. | A63B 60/00 473/248 |

(Continued)

FOREIGN PATENT DOCUMENTS

| | | | | |
|---|---|---|---|---|
| JP | 2002059453 | A | * | 2/2002 |
| JP | 2005236133 | A | * | 9/2005 |
| TW | I569855 | B | | 2/2017 |

*Primary Examiner* — Alvin A Hunter
(74) *Attorney, Agent, or Firm* — Muncy, Geissler, Olds & Lowe, P.C.

(57) ABSTRACT

A method includes: providing a mold assembly includes lower and upper molds; placing a release film on the lower mold and vacuuming a lower cavity of the lower mold; attaching a first molding member to the release film, and moving the release film and the first molding member into an upper cavity of the upper mold; placing a transfer film on the lower mold and vacuuming the lower cavity; attaching a second molding member to the transfer film; hot molding the first and second molding member into a golf club head part having a patterned surface formed by a transfer surface of the transfer film; and connecting the golf club head part to a golf head shell to obtain a golf club head.

12 Claims, 10 Drawing Sheets

(56) References Cited

U.S. PATENT DOCUMENTS 7,455,600 B2 * 11/2008 Imamoto ............... A63B 60/02
   473/345
9,469,054 B2 * 10/2016 Rho ....................... B32B 27/36

* cited by examiner

FIG.13

GOLF CLUB HEAD AND METHOD FOR MANUFACTURING THE SAME

CROSS-REFERENCE TO RELATED APPLICATION

This application claims priority of Taiwanese Patent Application No. 108147591, filed on Dec. 25, 2019.

FIELD

The disclosure relates to a gold club head and a method for manufacturing the same.

BACKGROUND

Taiwanese Patent No. 1569855 discloses a golf club head made of metal, which is more durable. However, in recent trend for making the golf club head, it is desirable to provide the golf club head with carbon fiber composite parts to reduce the overall weight of the metal golf club head and provide distinct surface patterns on the carbon fiber composite parts of the golf club head. For carbon fiber composite parts with larger curvature, it may be stuck on the molds after the molding process. Therefore, there remains room for improvement in both the structure of and process of manufacturing the golf club head.

SUMMARY

Therefore, a first aspect of the disclosure is to provide a method for manufacturing a golf club head that can alleviate at least one of the drawbacks of the prior art. The method includes:

(A) providing a mold assembly, the mold assembly including a lower mold and an upper mold, the lower mold having an inner surface that defines a lower cavity, the upper mold having an inner surface that defines an upper cavity having a shape identical to that of the lower cavity;

(B) placing a release film on the lower mold, and then vacuuming the lower cavity such that the release film is attached to the inner surface of the lower mold;

(C) placing a first molding member on the release film and in the lower cavity such that the first molding member is attached to the release film, and then moving the release film and the first molding member from the lower cavity into the upper cavity such that the release film is attached to the inner surface of the upper mold;

(D) placing on the lower mold a transfer film which has opposite release surface and transfer surface, and then vacuuming the lower cavity such that the release surface of the transfer film is attached to the inner surface of the lower mold;

(E) placing on the transfer film and in the lower cavity a second molding member which is in contact with the transfer surface of the transfer film;

(F) closing and heating the mold assembly, so as to hot mold the first molding member and the second molding member into a golf club head part which has a patterned surface formed by the transfer surface of the transfer film, and then removing the golf club head part from the mold assembly and removing the release film and the transfer film from the golf club head part; and (G) connecting the golf club head part to a golf club head shell to obtain a golf club head.

A second aspect of this disclosure provides the golf club head that is made by the method of the first aspect. The golf club head includes the golf club head shell, and the golf club head part that is connected to the golf club head shell and that has the patterned surface exposed from the golf club head shell.

A third aspect of this disclosure provides another method of manufacturing a golf club head. The method includes:

(A) providing a mold assembly, the mold assembly including a lower mold and an upper mold, the lower mold having an inner surface that defines a lower cavity, the upper mold having an inner surface that defines an upper cavity having a shape identical to that of the lower cavity;

(B) placing a release film on the lower mold, and then vacuuming the lower cavity such that the release film is attached to the inner surface of the lower mold;

(C) placing a first molding member on the release film and in the lower cavity such that the first molding member is attached to the release film, and then moving the release film and the first molding member from the lower cavity into the upper cavity such that the release film is attached to the inner surface of the upper mold;

(D') placing on the lower mold a transfer film assembly which has overlapping release layer and patterned layer having opposite patterned surface and adhesive surface, and then vacuuming the lower cavity such that the release layer of the transfer film assembly is attached to the inner surface of the lower mold;

(E') placing on the transfer film assembly and in the lower cavity a second molding member which is attached to the adhesive surface of the patterned layer;

(F') closing and heating the mold assembly so as to hot mold the first molding member and the second molding member into a molded assembly, and then removing the molded assembly from the mold assembly, and removing the release film and the release layer of the transfer film assembly from the molded assembly so as to obtain a golf club head part including the molded assembly and the patterned layer; and (G) connecting the golf club head part to a golf club head shell to obtain a golf club head.

A fourth aspect of this disclosure provides the golf club head that is made by the method of the third aspect. The golf club head includes the golf club head shell, and the golf club head part that is connected to the golf club head shell and that has the patterned surface exposed from the golf club head shell.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
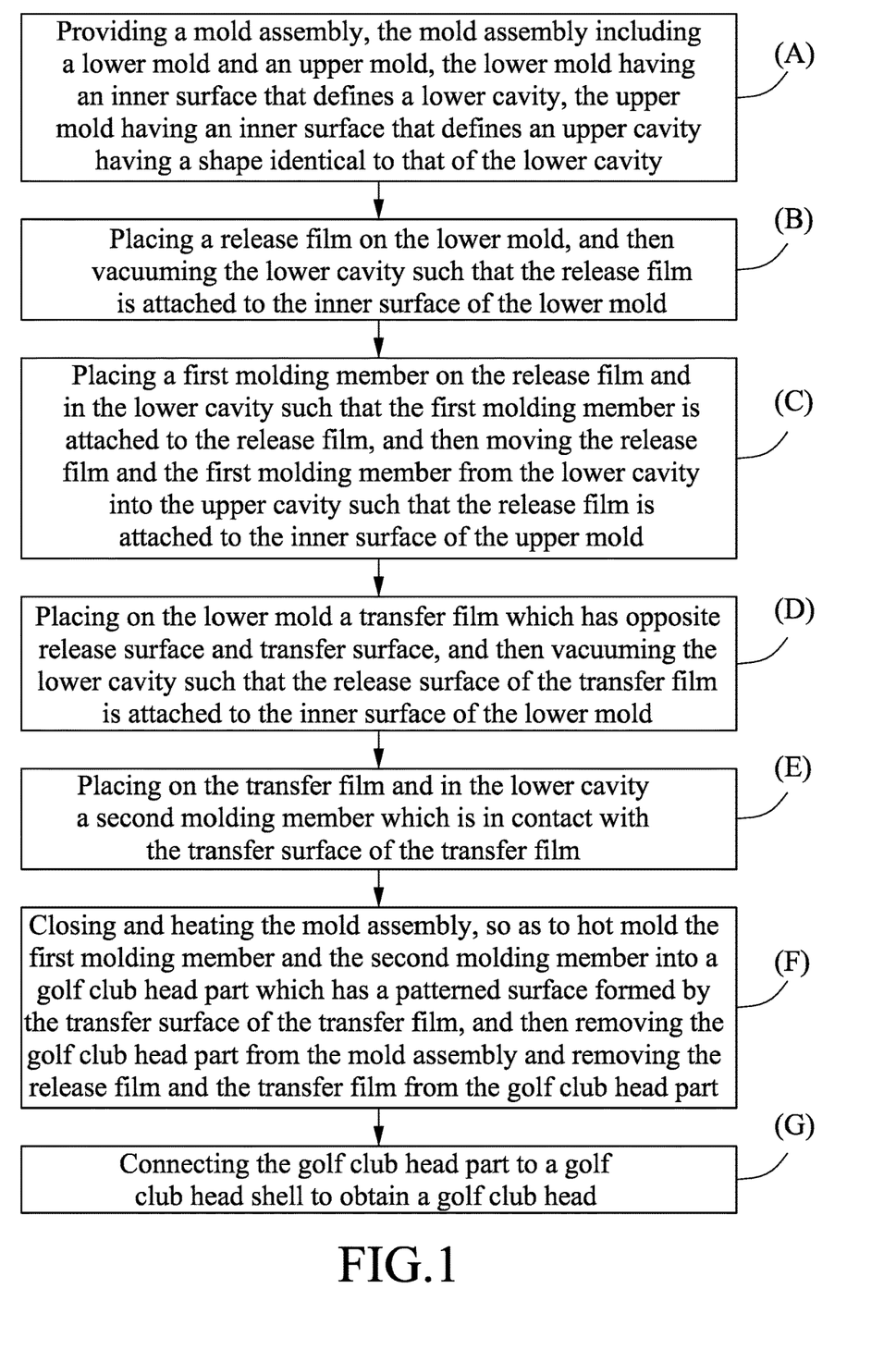
FIG. 1 is a flow chart of a first embodiment of a method for manufacturing a golf club head according to the present disclosure.
Figure 2:
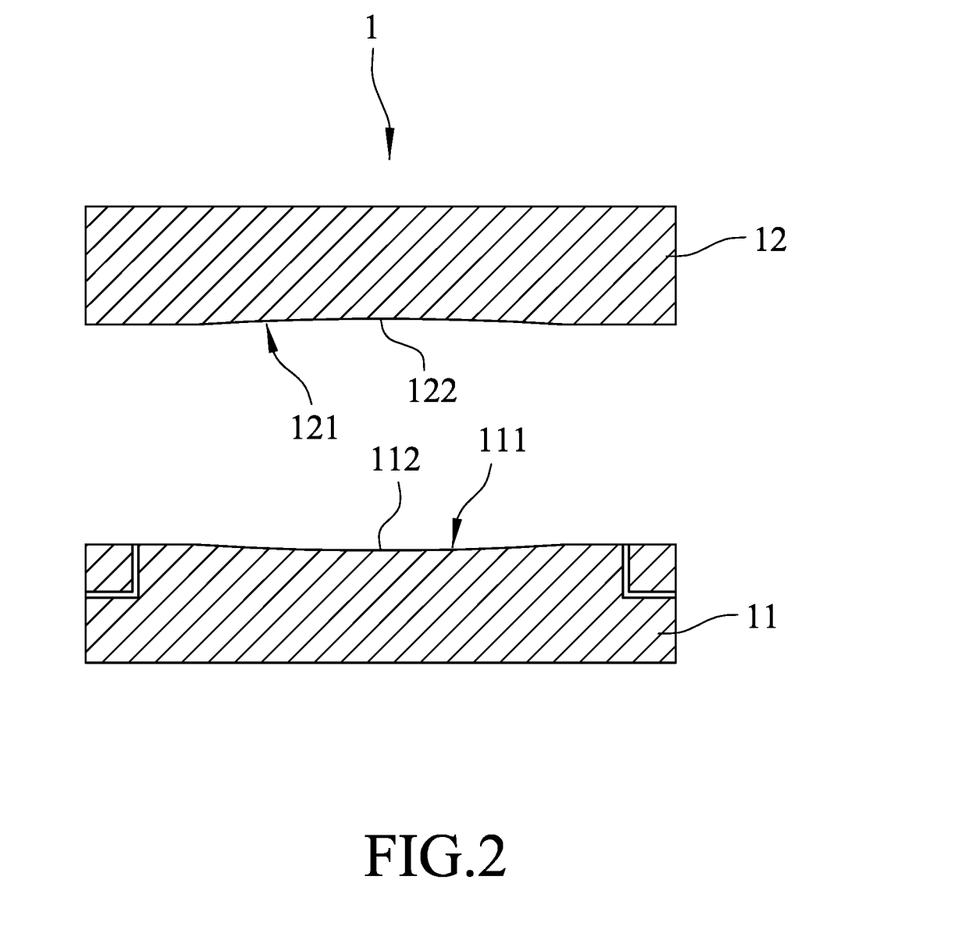
FIG. 2 is a sectional view of a mold assembly used in the first embodiment.
Figure 10:
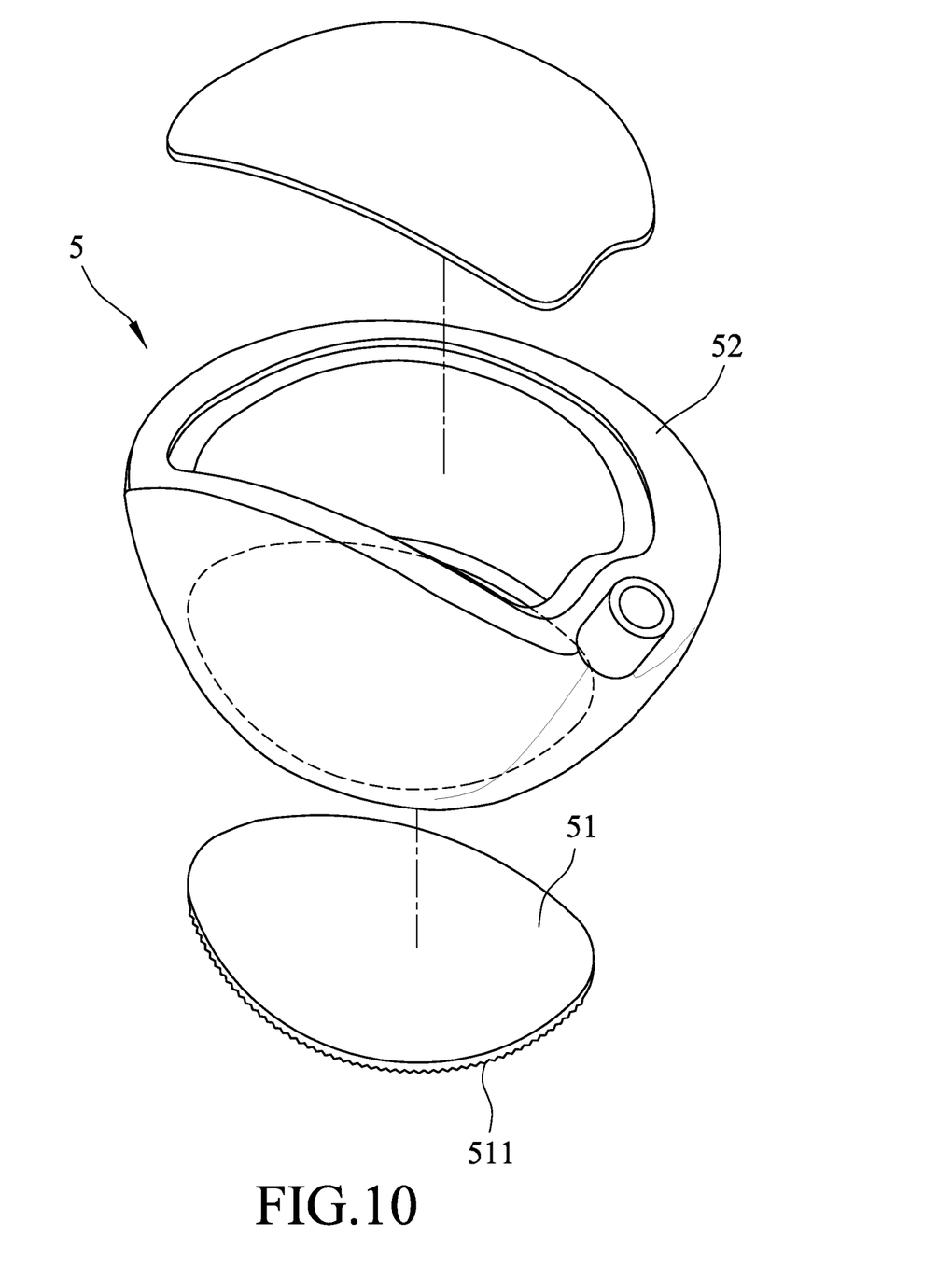
FIG. 10 is a schematic view of a step of the first embodiment, including connecting the golf club head part to a golf club head shell to obtain the golf club head.

Referring to FIGS. 1, 2 and 10, a first embodiment of a method for manufacturing a golf club head 5 according to the present disclosure is provided. The method includes steps (A) to (G).

In step (A), a mold assembly 1 is provided. The mold assembly 1 includes a lower mold 11 and an upper mold 12. The lower mold 11 has an inner surface 112 that defines a lower cavity 111. The upper mold 12 has an inner surface 122 that defines an upper cavity 121 which has a shape identical to that of the lower cavity 111.

In this embodiment, the lower mold 11 and the upper mold 12 are pre-heated in step (A) to a temperature ranging from, for example, 120° C. to 180° C. It should be noted that the lower mold 11 and the upper mold 12 are only schematically shown in FIG. 2, and the shapes of the lower mold 11 and the upper mold 12 may be changed according to practical requirements.

Figure 3:
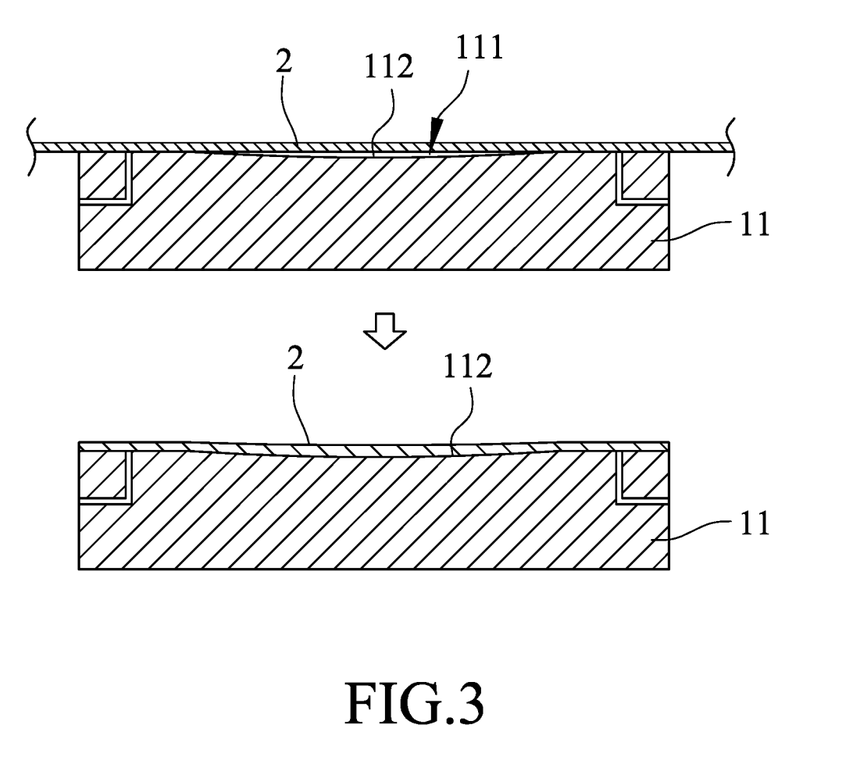
FIG. 3 is a schematic view of a step of the first embodiment, including placing a release film on a lower mold of the mold assembly and vacuuming a lower cavity of the lower mold.

Referring to FIGS. 1 and 3, in step (B), a release film 2 is placed on the lower mold 111, and then the lower cavity 111 of the lower mold 11 is vacuumed such that the release film 2 is attached to the inner surface 112 of the lower mold 11.

Figure 4:
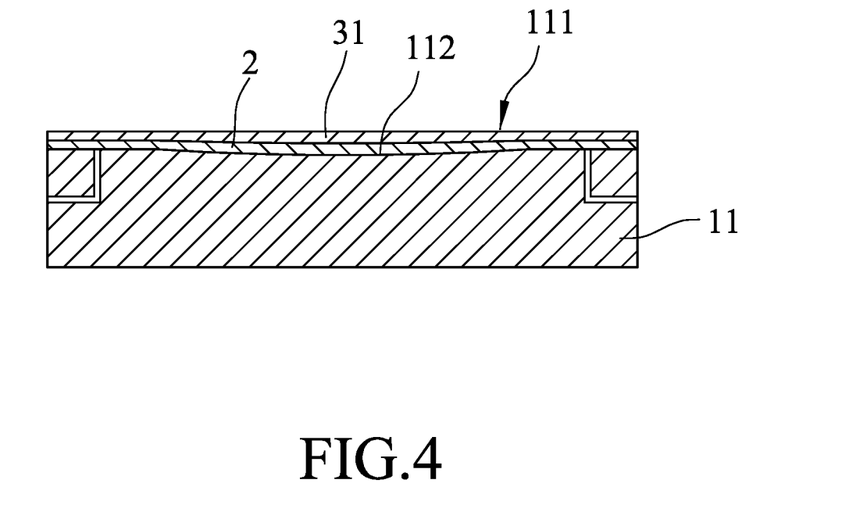
FIG. 4 is a schematic view of a step of the first embodiment, including placing a first molding member on the release film.
Figure 5:
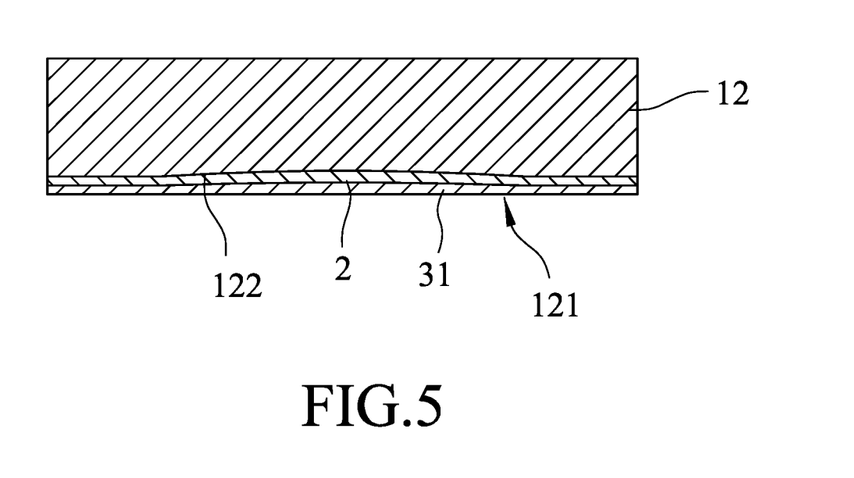
FIG. 5 is a schematic view of a step of the first embodiment, including moving the release film and the first molding member into an upper mold of the mold assembly.

Referring to FIGS. 1, 4 and 5, in step (C), a first molding member 31 is placed on the release film 2 and in the lower cavity 111 of the lower mold 11 such that the first molding member 31 is attached to the release film 2. In this embodiment, the first molding member is made of a resin-impregnated carbon fiber composite. The first molding member 31 may be pressed by a pressing member (not shown) or pressed manually to be attached to the release film 2. Then, the release film 2 and the first molding member 31 are moved from the lower cavity 111 of the lower mold 11 into the upper cavity 121 of the upper mold 12 such that the release film 2 is attached to the inner surface 122 of the upper mold 12. Since the lower cavity 111 of the lower mold 11 and the upper cavity 121 of the upper mold 12 have identical shape, the release film 2 and the first molding member 31 removed from the lower cavity 111 can be fitted into the upper cavity 121 with the release film 2 fittingly attached to the inner surface 122 of the upper mold 12. The upper cavity 121 of the upper mold 12 may be vacuumed to ensure that the release film 2 is attached to the inner surface 122 of the upper mold 12. Additionally, the upper mold 12 may be made of a magnetic material, and the release film 2 and the first molding member 31 may be limited on the upper mold 12 via a magnetic frame (not shown) attracted to the upper mold 12, thereby preventing the release film 2 and the first molding member 31 from easily falling off the upper mold 12. It is worth mentioning that, due to the gravity of earth, it is easier to place the release film 2 and the first molding member 31 into the lower cavity 111 of the lower mold 11 as opposed to the upper cavity 121 of the upper mold 12. Therefore, by shaping the release film 2 and the first molding member 31 in the lower cavity 111, followed by moving the release film 2 and the first molding member 31 into the upper cavity 121, the yield of the process is improved.

Figure 6:
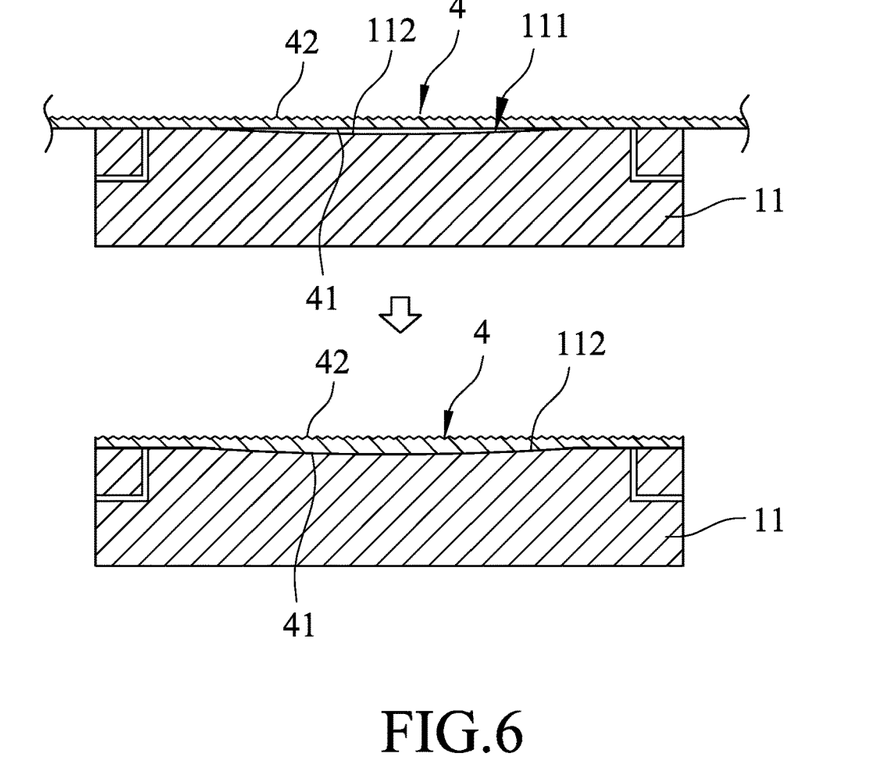
FIG. 6 is a schematic view of a step of the first embodiment, including placing a transfer film on the lower mold and vacuuming the lower cavity of the lower mold.

Referring to FIGS. 1 and 6, in step (D), a transfer film 4, which has opposite release surface 41 and transfer surface 42, is placed on the lower mold 11. Then, the lower cavity 111 is vacuumed such that the release surface 41 of the release film 4 is attached to the inner surface 112 of the lower mold 11.

Figure 7:
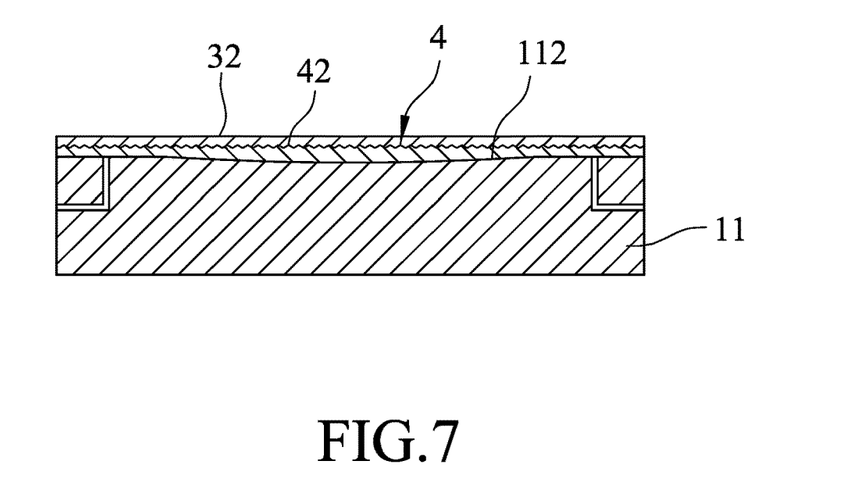
FIG. 7 is a schematic view of a step of the first embodiment, including placing a second molding member on the transfer film.

Referring to FIGS. 1 and 7, in step (E), a second molding member 32 is placed on the transfer film 4 and in the lower cavity 111 to be in contact with the transfer surface 42 of the transfer film 4. In this embodiment, the second molding member 32 is made of a resin-impregnated carbon fiber composite.

Figure 8:
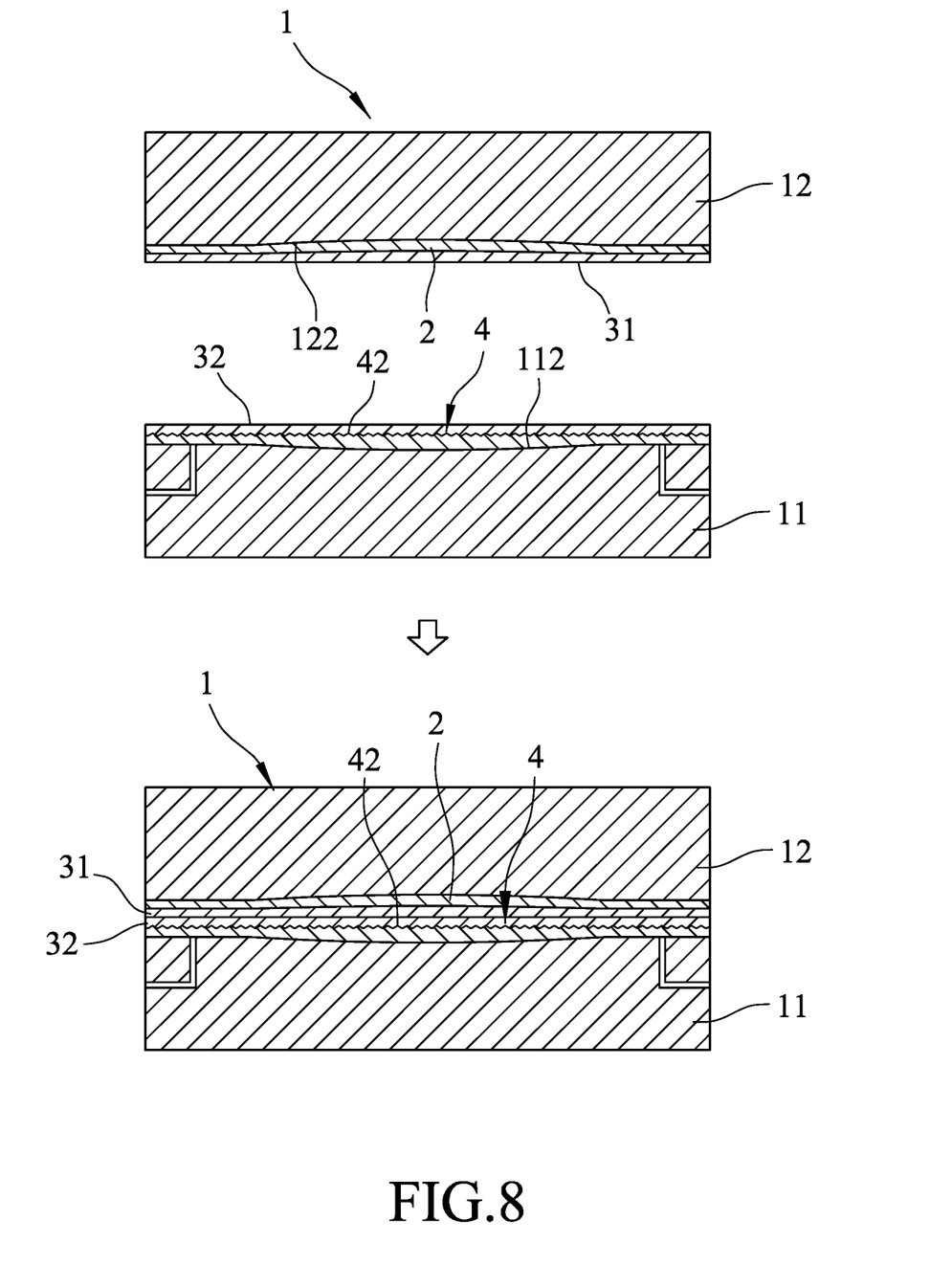
FIG. 8 is a schematic view of a step of the first embodiment, including closing and heating the mold assembly to obtain a golf club head part.
Figure 9:
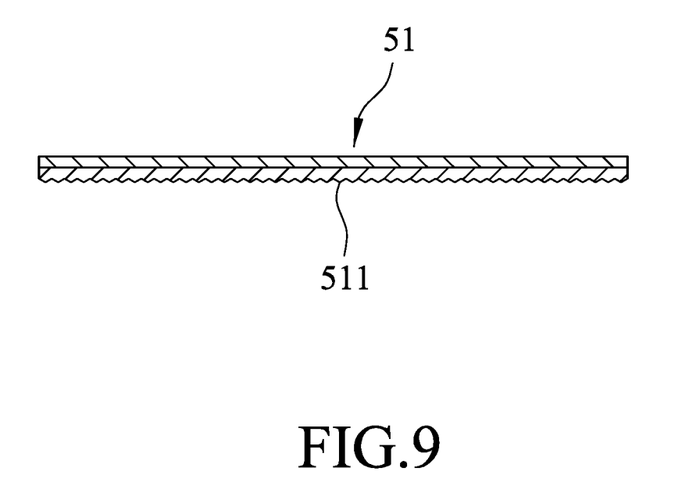
FIG. 9 is a sectional view of the golf club head part, which has a patterned surface.

Referring to FIGS. 1, S and 9, in step (F), the mold assembly 1 is closed and heated, so as to hot mold the first molding member 31 and the second molding member 32 into a golf club head part 51 which has a patterned surface 511 formed by the transfer surface 42 of the transfer film 4. Then, the golf club head part 51 is removed from the mold assembly 1, and the release film 2 and the transfer film 4 are removed from the golf club head part 51. The patterned surface 511 of the golf club head part 51 may have embossing of different patterns or multiple regions with different roughness, which demonstrate distinct visual appearances, such as glossy or matt. The patterned surface 511 may be non-uniform, such as a gradually changing non-uniform pattern.

Referring to FIGS. 1 and 10, in step (G), the gold club head part 51 is connected to a golf club head shell 52 to obtain the golf club head 5. The patterned surface 511 of the gold club head part 51 is exposed from the golf club head shell 52. In this embodiment, the gold club head part 51 is illustrated in FIG. 10 to be connected to the bottom portion of the golf club head shell 52. However, it should be noted that the gold club head part 51 may be connected to the top portion of the golf club head shell 52. Alternatively, there may be two gold club head parts 51 that are respectively connected to the top and bottom portions or other portions of the golf club head shell 52, according to practical requirements.

Both the carbon fiber composite material of the golf club head part 51 and the patterned surface 511 of the golf club head part 51 are capable of providing visual appearances different from the metal parts of the golf club head 5. If the patterned surface 511 is made to have greater roughness, the patterned surface 511 will look matt, and if the patterned surface 511 is made to have less roughness, the patterned surface 511 will look glossier. Alternatively, the patterned surface 511 may be made to have parts with different roughness to provide the patterned surface 511 with a gradually changing appearance. The release film 2 and the transfer film 4 may serve as release films for the golf club head part 51 such that the golf club head part 51 can be easily removed from the mold assembly 1. The vacuuming process ensures that the release film 2 and the transfer film 4 are fittingly attached to the mold assembly 1, thereby preventing wrinkles to appear on the final product. Moreover, by first placing the release film 2 and the first molding member 31 into the lower cavity 111 of the lower mold 11 to pre-shape the same, it is easier to place the release film 2 and the first molding member 31 into the upper cavity 121 which has the shape identical to that of the lower cavity 111.

Figure 11:
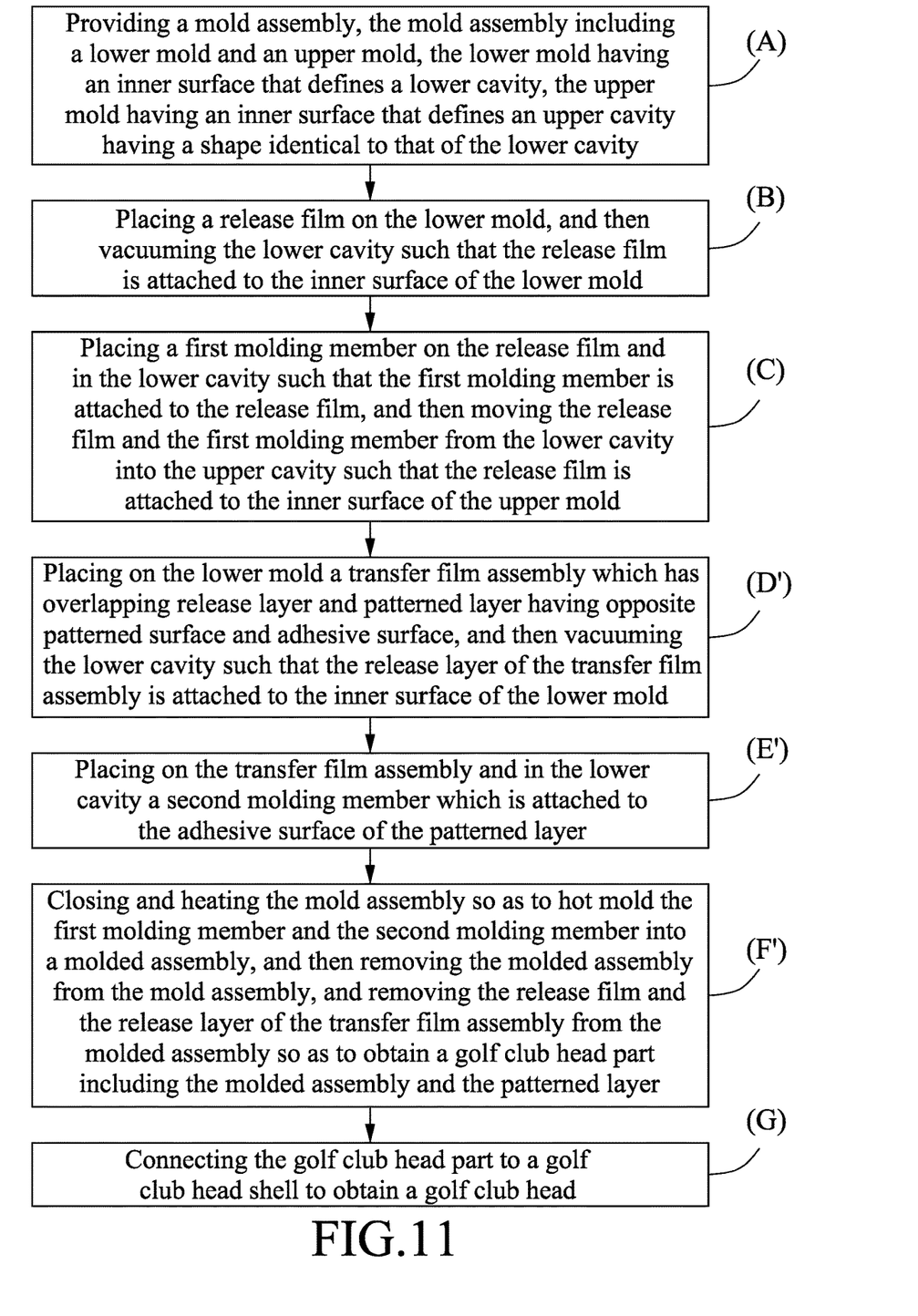
FIG. 11 is a flow chart of a second embodiment of the method for manufacturing the golf club head according to the present disclosure
Figure 12:
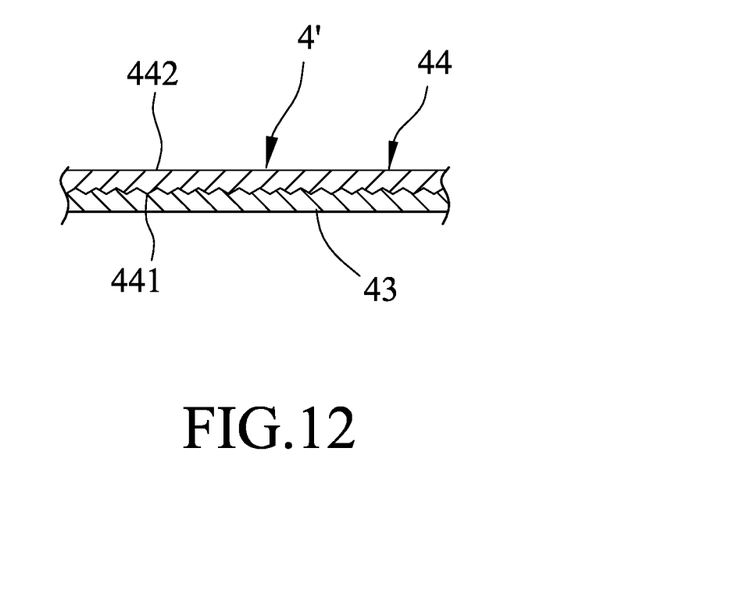
FIG. 12 is a fragmentary sectional view of a transfer film assembly used in the second embodiment.
Figure 13:
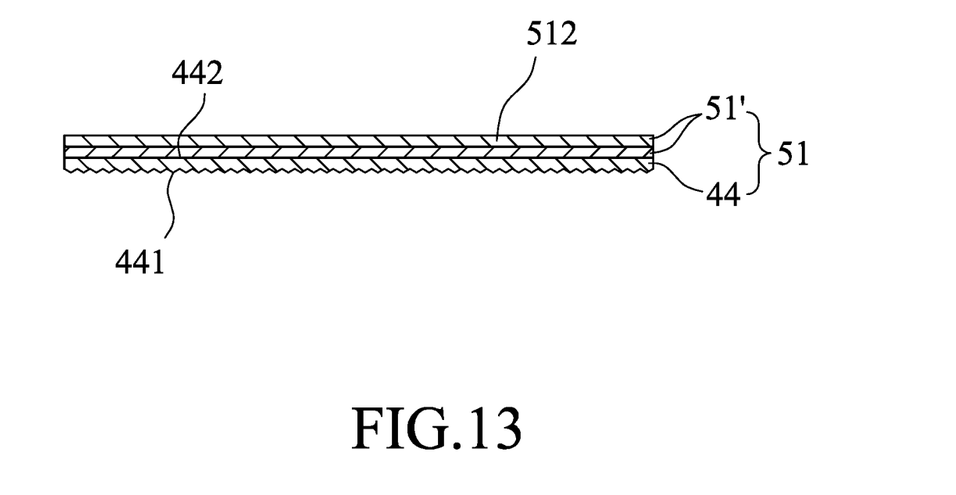
FIG. 13 is a sectional view of the golf club head part obtained during the second embodiment.

Referring to FIGS. 11 to 13, a second embodiment of the method for manufacturing the golf club head 5 according to the present disclosure is provided. The method includes steps (A), (B), (C), (D'), (E'), (F') and (G), and is similar to the steps of the first embodiment, with differences described hereinafter.

In step (D'), a transfer film assembly 4', which has overlapped release layer 43 and patterned layer 44, is placed on the lower mold 11 (see FIG. 6). The patterned layer 44 has opposite patterned surface 441 and adhesive surface 442. Then, the lower cavity 111 of the lower mold 11 is vacuumed such that the release layer 43 of the transfer film assembly 4' is attached to the inner surface 112 (see FIG. 6) of the lower mold 11.

In step (E'), the second molding member 32 is placed on the transfer film assembly 4', and is attached to the adhesive surface 442 of the patterned layer 44.

In step (F'), the mold assembly 1 is closed and heated so as to hot mold the first molding member 31 and the second molding member 32 into a molded assembly 51'. Then, the molded assembly 51' is removed from the mold assembly 1, and the release film 2 and the release layer 43 of the transfer film assembly 4' are removed from the molded assembly 51' so as to obtain the golf club head part 51 including the molded assembly 51' and the patterned layer 44 having the patterned surface 441.

The second embodiment provides an alternative way of imparting a surface structure (i.e., the patterned surface 441) to the golf club head 5.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for manufacturing a golf club head, the method comprising:
   (A) providing a mold assembly, the mold assembly including a lower mold and an upper mold, the lower mold having an inner surface that defines a lower cavity, the upper mold having an inner surface that defines an upper cavity having a shape identical to that of the lower cavity;
   (B) placing a release film on the lower mold, and then vacuuming the lower cavity such that the release film is attached to the inner surface of the lower mold;
   (C) placing a first molding member on the release film and in the lower cavity such that the first molding member is attached to the release film, and then moving the release film and the first molding member from the lower cavity into the upper cavity such that the release film is attached to the inner surface of the upper mold;
   (D) placing on the lower mold a transfer film which has opposite release surface and transfer surface, and then vacuuming the lower cavity such that the release surface of the transfer film is attached to the inner surface of the lower mold;
   (E) placing on the transfer film and in the lower cavity a second molding member which is in contact with the transfer surface of the transfer film;
   (F) closing and heating the mold assembly, so as to hot mold the first molding member and the second molding member into a golf club head part which has a patterned surface formed by the transfer surface of the transfer film, and then removing the golf club head part from the mold assembly and removing the release film and the transfer film from the golf club head part; and
   (G) connecting the golf club head part to a golf club head shell to obtain a golf club head.

2. The method as claimed in claim 1, wherein each of the first and second molding members is made of a resin-impregnated carbon fiber composite.

3. The method as claimed in claim 1, wherein the patterned surface of the golf club head part is non-uniform.

4. The method as claimed in claim 1, wherein, in step (A), the lower mold and the upper mold are pre-heated.

5. The method as claimed in claim 4, wherein the lower mold and the upper mold are pre-heated to a temperature ranging from 120° C. to 180° C.

6. A golf club head made by the method of claim 1, wherein said golf club head includes said golf club head shell, and said golf club head part that is connected to said golf club head shell and that has said patterned surface exposed from said golf club head shell.

7. A method for manufacturing a gold club head, the method comprising:
   (A) providing a mold assembly, the mold assembly including a lower mold and an upper mold, the lower mold having an inner surface that defines a lower cavity, the upper mold having an inner surface that defines an upper cavity having a shape identical to that of the lower cavity;
   (B) placing a release film on the lower mold, and then vacuuming the lower cavity such that the release film is attached to the inner surface of the lower mold;
   (C) placing a first molding member on the release film and in the lower cavity such that the first molding member is attached to the release film, and then moving the release film and the first molding member from the lower cavity into the upper cavity such that the release film is attached to the inner surface of the upper mold;

(D') placing on the lower mold a transfer film assembly which has overlapped release layer and patterned layer having opposite patterned surface and adhesive surface, and then vacuuming the lower cavity such that the release layer of the transfer film assembly is attached to the inner surface of the lower mold;

(E') placing on the transfer film assembly and in the lower cavity a second molding member which is attached to the adhesive surface of the patterned layer;

(F') closing and heating the mold assembly so as to hot mold the first molding member and the second molding member into a molded assembly, and then removing the molded assembly from the mold assembly, and removing the release film and the release layer of the transfer film assembly from the molded assembly so as to obtain a golf club head part including the molded assembly and the patterned layer; and (G) connecting the golf club head part to a golf club head shell to obtain a gold club head.

8. The method as claimed in claim 7, wherein each of the first and second molding members is made of a resin-impregnated carbon fiber composite.

9. The method as claimed in claim 7, wherein the patterned surface of the patterned film is non-uniform.

10. The method as claimed in claim 7, wherein, in step (A), the lower mold and the upper mold are pre-heated.

11. The method as claimed in claim 10, wherein the lower mold and the upper mold are pre-heated to a temperature ranging from 120° C. to 180° C.

12. A golf club head made by the method of claim 7, wherein said golf club head includes said golf club head shell, and said golf club head part that is connected to said golf club head shell and that has said patterned surface exposed from said golf club head shell.

* * * * *